（12）United States Patent
Kolondra et al.

(10) Patent No.: US 11,106,355 B2
(45) Date of Patent: Aug. 31, 2021

(54) DRAG MENU

(71) Applicant: Opera Norway AS, Oslo (NO)

(72) Inventors: Krystian Kolondra, Wroclaw (PL); Joanna Czajka, Wroclaw (PL); Maciej Kocemba, Wroclaw (PL)

(73) Assignee: OPERA NORWAY AS, Oslo (NO)

( * ) Notice: Subject to any disclaimer, the term of this patent is extended or adjusted under 35 U.S.C. 154(b) by 0 days.

(21) Appl. No.: 16/389,540

(22) Filed: Apr. 19, 2019

(65) Prior Publication Data

US 2019/0324636 A1  Oct. 24, 2019

Related U.S. Application Data

(60) Provisional application No. 62/660,401, filed on Apr. 20, 2018.

(51) Int. Cl.
G06F 3/0488 (2013.01)
G06F 3/0482 (2013.01)
G06F 3/0481 (2013.01)

(52) U.S. Cl.
CPC ........ G06F 3/04883 (2013.01); G06F 3/0482 (2013.01); G06F 3/04817 (2013.01)

(58) Field of Classification Search
CPC .. G06F 3/0482; G06F 3/04817; G06F 3/0481; G06F 3/04886; G06F 3/0485
See application file for complete search history.

(56) References Cited

U.S. PATENT DOCUMENTS

| | | | | |
|---|---|---|---|---|
| D857,044 S | * | 8/2019 | Shriram | D14/486 |
| 2004/0212617 A1 | * | 10/2004 | Fitzmaurice | G06F 3/0481 345/440 |
| 2010/0306702 A1 | * | 12/2010 | Warner | G06F 3/0482 715/811 |
| 2013/0104079 A1 | * | 4/2013 | Yasui | G06F 3/0482 715/834 |
| 2013/0127911 A1 | * | 5/2013 | Brown | G06F 3/04886 345/649 |
| 2013/0212535 A1 | * | 8/2013 | Kim | G06F 3/0482 715/841 |
| 2014/0075388 A1 | * | 3/2014 | Kuscher | G06F 3/0482 715/834 |
| 2014/0168122 A1 | * | 6/2014 | Jiang | G06F 3/0485 345/173 |
| 2015/0346994 A1 | * | 12/2015 | Chanyontpatanakul | G06F 3/0482 715/828 |

(Continued)

Primary Examiner — Toan H Vu
(74) Attorney, Agent, or Firm — Nicholas Panno

(57) ABSTRACT

A method and apparatus configured to implement a Drag Menu for providing data service includes selecting menu items from a menu of a mobile device. A processor of a mobile device causes a base icon to be displayed on a touch-sensitive display of the mobile device at a position easy to access by a user of the mobile device with a finger of a hand of the user when the user is holding the mobile device with only the hand. This causes the processor to display a plurality of context menu items in at least a partial ring around the base icon. The processor also causes a plurality of global menu items to be displayed on the display in at least a partial ring around the context menu items. The processor accesses or implements an action associated with one of the menu items in response to the user using a drag gesture from the base icon to one menu item on the touch-sensitive display.

20 Claims, 8 Drawing Sheets

(56) References Cited

U.S. PATENT DOCUMENTS

2016/0147384 A1* 5/2016 Hong .................. G06F 3/04817
                                                             715/765
2017/0192627 A1* 7/2017 Agnoli .................. G06F 3/0482

* cited by examiner

DRAG MENU

This application claims the benefit of U.S. Provisional Patent Application No. 62/660,401, filed Apr. 20, 2018, which is incorporated by reference in its entirety.

The present disclosure relates to a DRAG MENU implemented on a user interface of a mobile device for providing data service.

Operating a mobile device (e.g., phone, tablet) with one hand can be difficult and inconvenient for a user to access various elements displayed on a mobile device screen. The user has a limited access to various elements only displayed in a limited screen area. Moreover, touch elements that require precise interaction can be hard to access, especially if they are placed outside the convenient area of finger operation. The limited area available to an application may lead to hiding elements inside submenus which are often even harder to access. As a result, it is very hard to operate applications via a touch-sensitive screen of the mobile device with just one hand using a thumb only.

In an exemplary embodiment of the present disclosure, a method and apparatus configured to implement a Drag Menu for providing data service includes selecting menu items from a menu of a mobile device. A processor of a mobile device causes a base icon to be displayed on a touch-sensitive display of the mobile device at a position easy to access by a user of the mobile device with a finger of a hand of the user when the user is holding the mobile device with only the hand. This causes the processor to display a plurality of context menu items in at least a partial ring around the base icon. The processor also causes a plurality of global menu items to be displayed on the display in at least a partial ring around the context menu items. The processor accesses or implements an action associated with one of the menu items in response to the user using a drag gesture from the base icon to one menu item on the touch-sensitive display.

The accompanying drawings illustrate a method for organizing menus in a way that targets single-hand operation on a mobile device and lays out menu items according to importance and context-relevance. It will be appreciated that the invention is not limited to only the embodiments set forth within this disclosure. Rather, the particular algorithms described herein are meant to be exemplary of many different heuristics that can be employed for the purpose of organizing menu items in a user interface.

All items in the menu may be accessed with a single hand without a need to change grip. Classic menu and sub-menu user interface (UI) elements can be removed to save available screen space.

Embodiments of the present disclosure provides a Drag Menu configured to allow a user to use one finger gesture on a user interface of a mobile device to navigate the Internet through an application. The Drag Menu may include a plurality of user interface UI elements, such as a base icon (e.g., Drag Menu Button), context menu items and global menu items displayed on the user interface of the mobile device. The Drag Menu may be invoked by starting a dragging gesture on a Drag Menu button on a touch-sensitive screen. The Drag Menu button may be conveniently displayed in an accessible area of a display of the mobile device. The Drag Menu may combine a Drag Menu button with a plurality of context menu items and a plurality of global menus items for a given screen. There may be a visual distinction between these items as they are displayed on the display screen of the mobile device. For example, context menu items may be closer to the Drag Menu button on the display screen. An action may be performed if a dragging gesture is completed over a dedicated UI element. Completing the drag gesture outside of any of the action UI elements may not trigger an action. The user may receive feedback (such as visual, haptic, vibration, or sound) when the dragging gesture enters an action associated with the UI element. Feedback may play a vital role to ensure that the user is certain which action is about to be triggered.

The Drag Menu may address challenges of combining multiple actions in one Drag Menu and saving display space on the screen. The Drag Menu may also provide convenient, fast, and reliable access and interaction of associated actions as it is gesture-driven. The Drag Menu may provide a fast Internet navigation for a user using finger gestures and enhance user experience especially when a user on the move.

Figure 1:
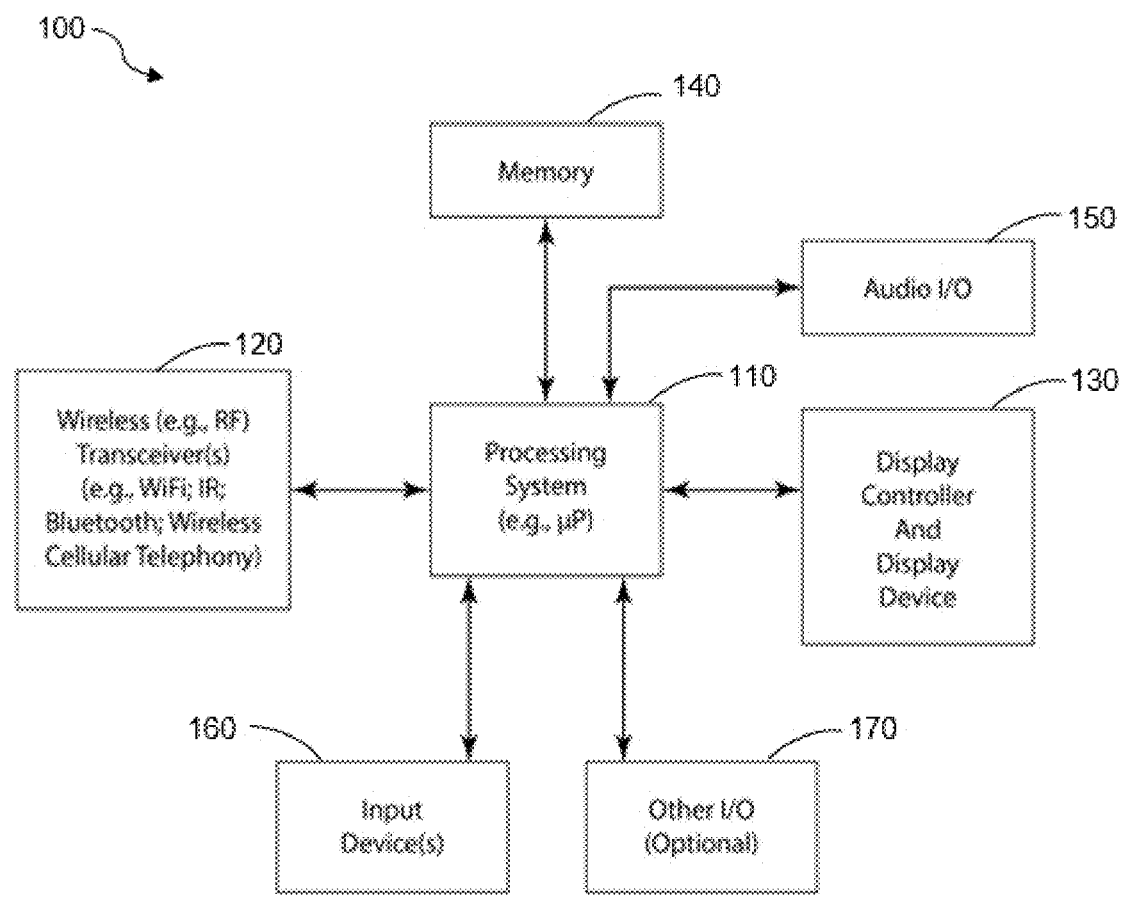
FIG. 1 is a block diagram illustrating a simplified mobile device architecture according to some embodiments of the present disclosure.

FIG. 1 is a block diagram illustrating a simplified mobile device architecture in which some example embodiments may be implemented. The mobile device architecture 100 may include a data processing system 110, communication subsystems 120, display device 130, memory component 140, audio input and output subsystems 150, and/or input devices 160. The illustrated data processing system 110 may be a processor-controlled data processing system. The data processing system 110 may include one or more microprocessor components, connected or coupled to a memory component 140 and the display device 130. The data processing system 110 may execute instructions of an operating system (such as Android or iOS systems), running programs such as a browser, for example the Opera Touch™ browser application, storing and loading data from the memory component 140. In addition, the mobile device 100 may be equipped with a display controller and a display device 130, which allow it to present information and data in the form of a visual user interface to the user. The display device 130 may be a touch-sensitive. Similarly, the mobile device 100 may include various audio input and output subsystems 150, such as microphone and speakers used, for example, to play audio or record user voice input. The mobile device 100 illustrated in FIG. 1, may also include communication subsystems 120, such as a wireless transceiver or cellular telephony module, which allow the mobile device 100 to communicate with compatible systems to transmit and receive data over a network (not shown). The network may include a satellite-based navigation system or a terrestrial wireless network, such as Wi-Fi or other type of wired or wireless networks to facilitate communications between the various network devices associated with the example system 100. Furthermore, the network may be a single network or a combination of networks, which may or may not all use similar communication protocols and/or techniques.

This mobile device 100 may include input devices 160 which allows a user to provide input to the data processing system 100. These input devices 160 may be a keyboard or a multi-touch panel coupled to or embedded with the display devices 130. It will be appreciated that one or more buses, not shown here, may be used to interconnect the various components as is well known in the art. The mobile device 100 shown in FIG. 1 may be a mobile smartphone or another handheld computing device, such as a tablet or a laptop computer. In other embodiments, the data processing system 110 may include fewer components or perhaps more components than components illustrated in FIG. 1.

Figure 2:
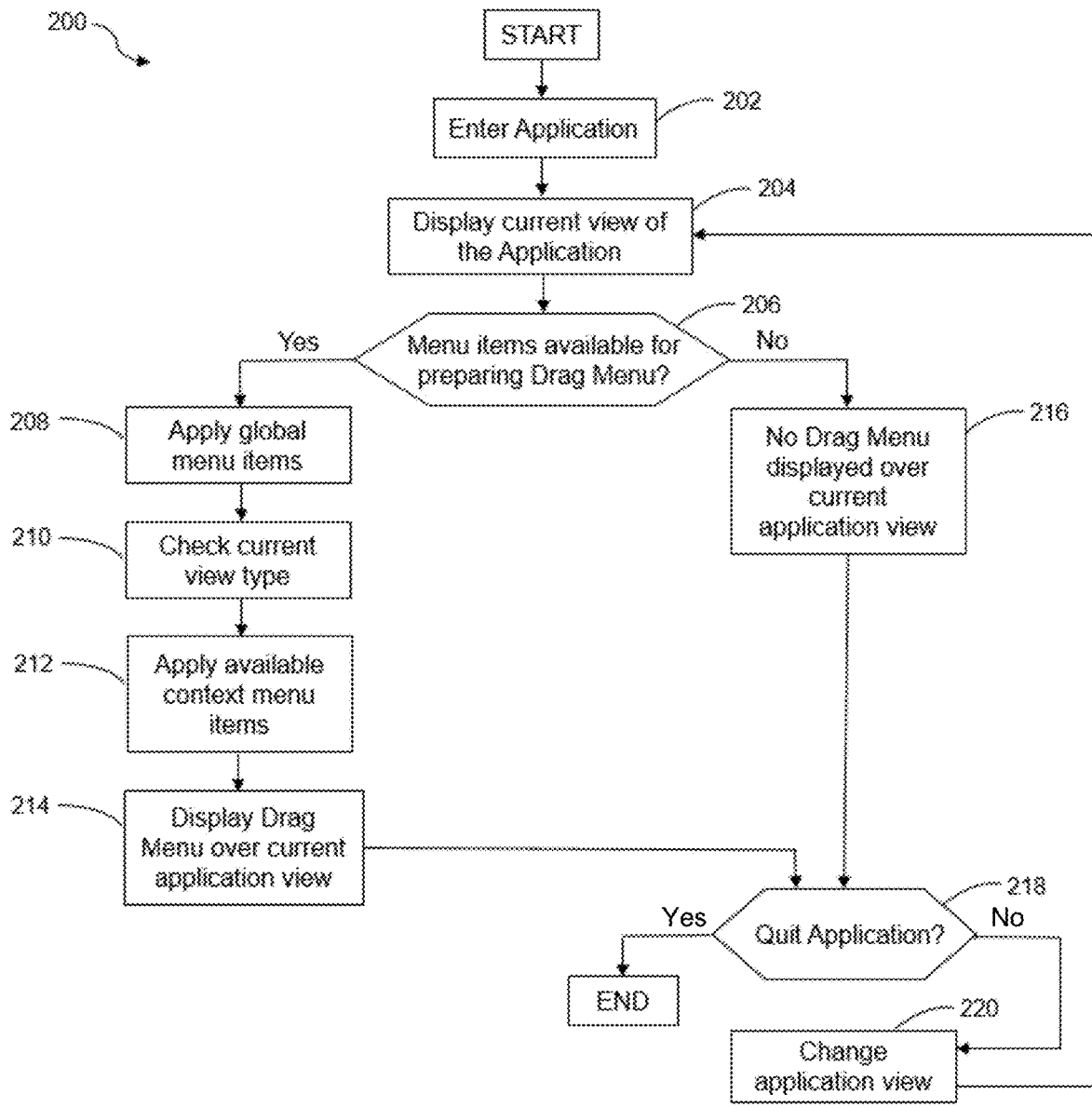
FIG. 2 is a flowchart to determine and present an application current state with a Drag Menu according to some embodiments of the present disclosure.

FIG. 2 is a flow diagram illustrating an example process 200 to determine how to prepare and display a Drag Menu on a user interface of a mobile device over the active application view according to some embodiments of the present disclosure.

At 202, the Drag Menu may be configured to be available in context of an existing application, such as the Opera Touch™ browser application. The application can be installed and run on the data processing system 110 of the mobile device 100 as illustrated in FIG. 1. As described in the process 200 in FIG. 2, the application may be configured to apply a Drag Menu on the display screen of the mobile device 100 for a user to access and manage information.

Figure 3:
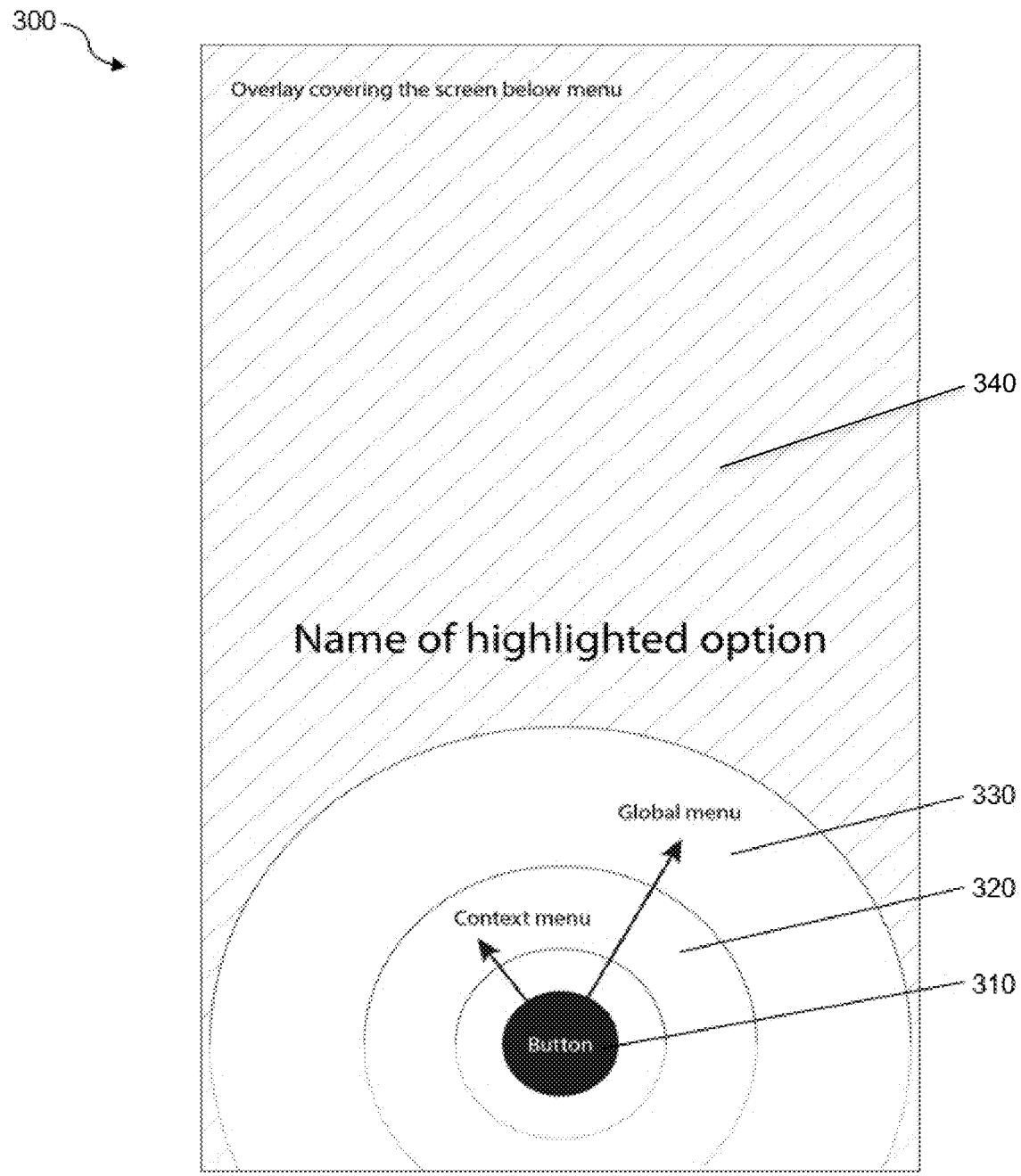
FIG. 3 is a graph illustrating a general layout of a Drag Menu according to some embodiments of the present disclosure.

FIG. 3 is a graph 300 illustrating a general layout of a Drag Menu to be presented on a display screen 340 according to some embodiments of the present disclosure. The Drag Menu may include Drag Menu button 310, context menu 320 and global menu 330. The Drag Menu may be arranged to be close to the bottom of the device display screen 340 so that it facilitates single-hand operation, for example, with the thumb, without the need for the user to change hand grip.

Figure 4:
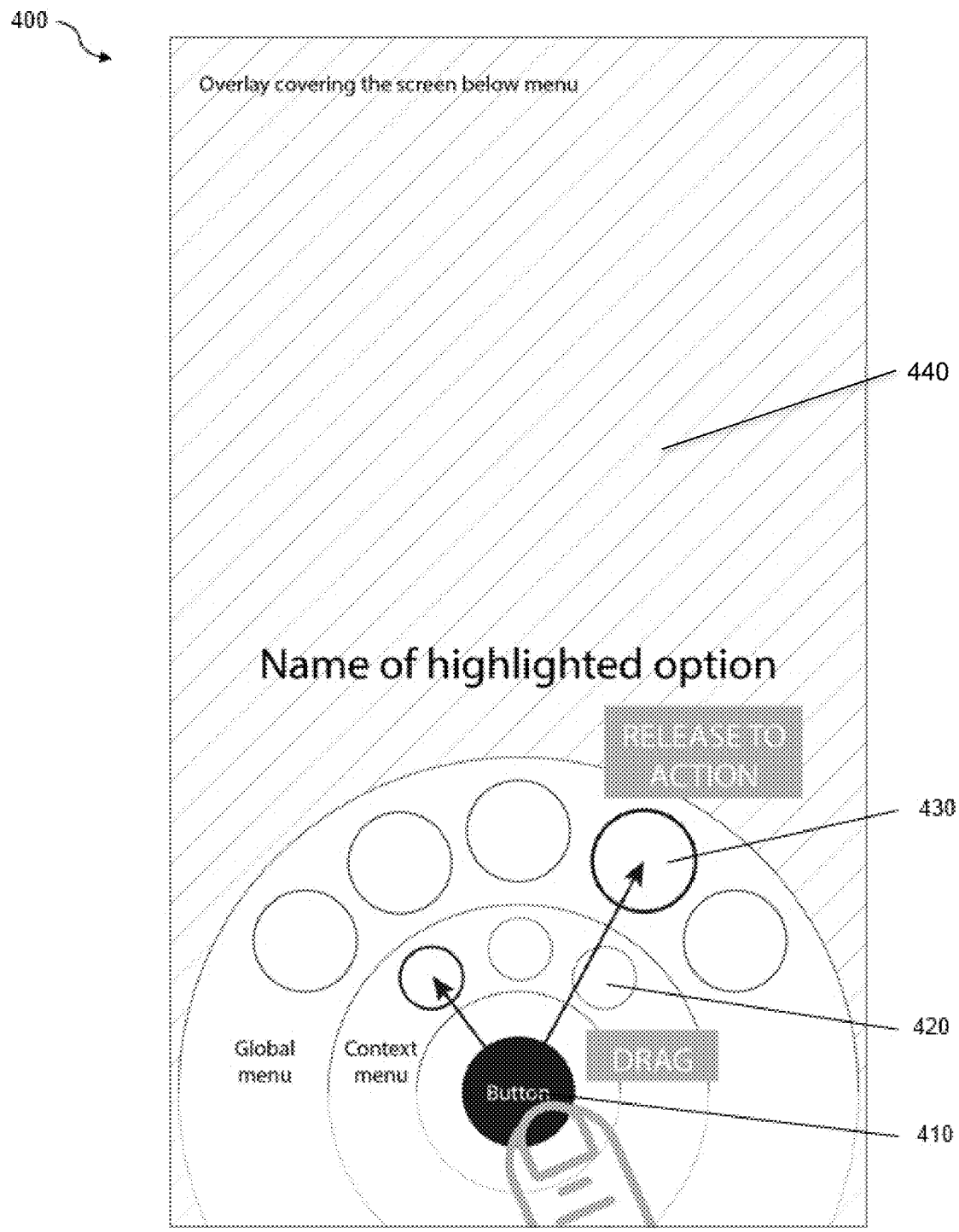
FIG. 4 is a graph illustrating a Drag Menu in action according to some embodiments of the present disclosure.

FIG. 4 is a graph illustrating a Drag Menu in action on an display screen 440 according to some embodiments of the present disclosure. FIG. 4 presents components and locations of menu items in the Drag Menu over the display screen 440 of the mobile device. A plurality of context menu items 420 may be located in at least a partial ring around the Drag Menu button 410 of Drag Menu. A plurality of global menu items 430 may located in at least a partial ring around context menu items 420 in the Drag Menu button 410 of the Drag Menu.

The data processing system 110 or the process of a mobile device 100 may be configured to cause the Drag Menu button and a plurality of menu items to be displayed on a touch-sensitive display of the mobile device at a position easy to access by a user of the mobile device with a finger of a hand of the user when the user is holding the mobile device with only the hand.

At 204, once the application is launched by a user on the mobile device 100, the application may be configured by a processor of the data processing system to display a current active application view presenting the application's current state. For example, in one embodiment, a current active application view may be a home screen of an application. After the application is started or launched by the user, the Drag Menu button may be initially the only visible element displayed on the display screen of the mobile device. The Drag Menu button is always available on the application browser screen and provides a user direct access to an instant search. From this state, the Drag Menu may be opened by swiping from the Drag Menu button or holding the Drag Menu button.

Figure 5:
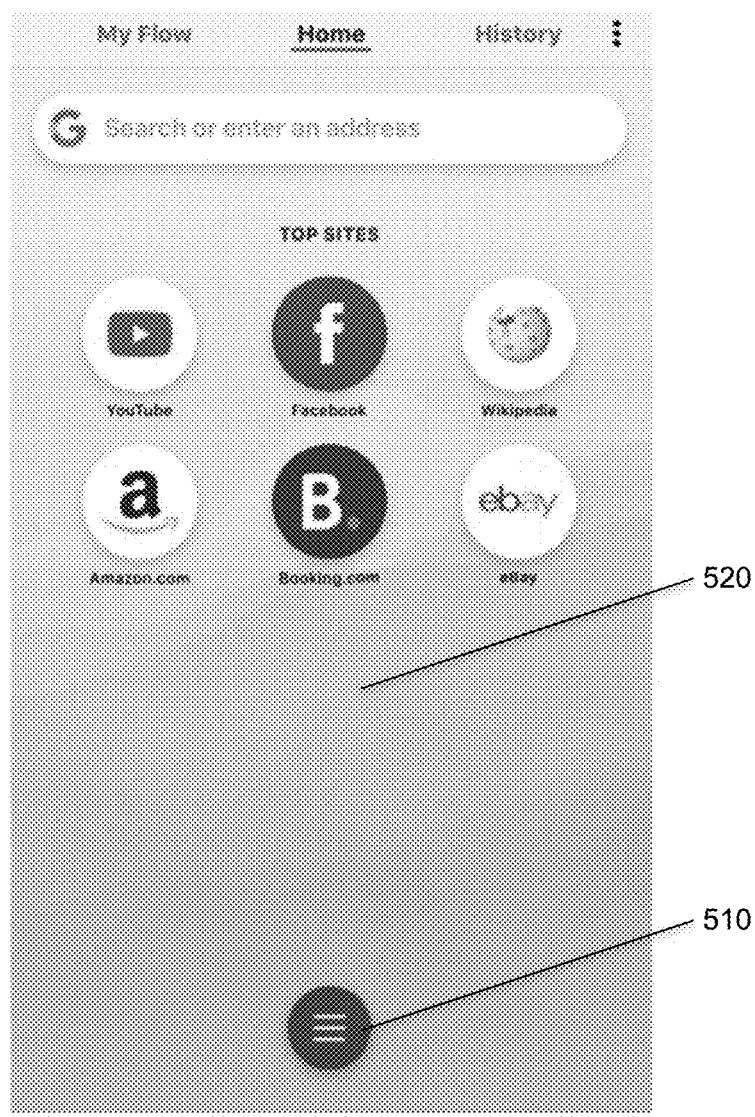
FIG. 5 is a graph illustrating an example display screen having a Drag Menu button according to one embodiment of the present disclosure.
Figure 6:
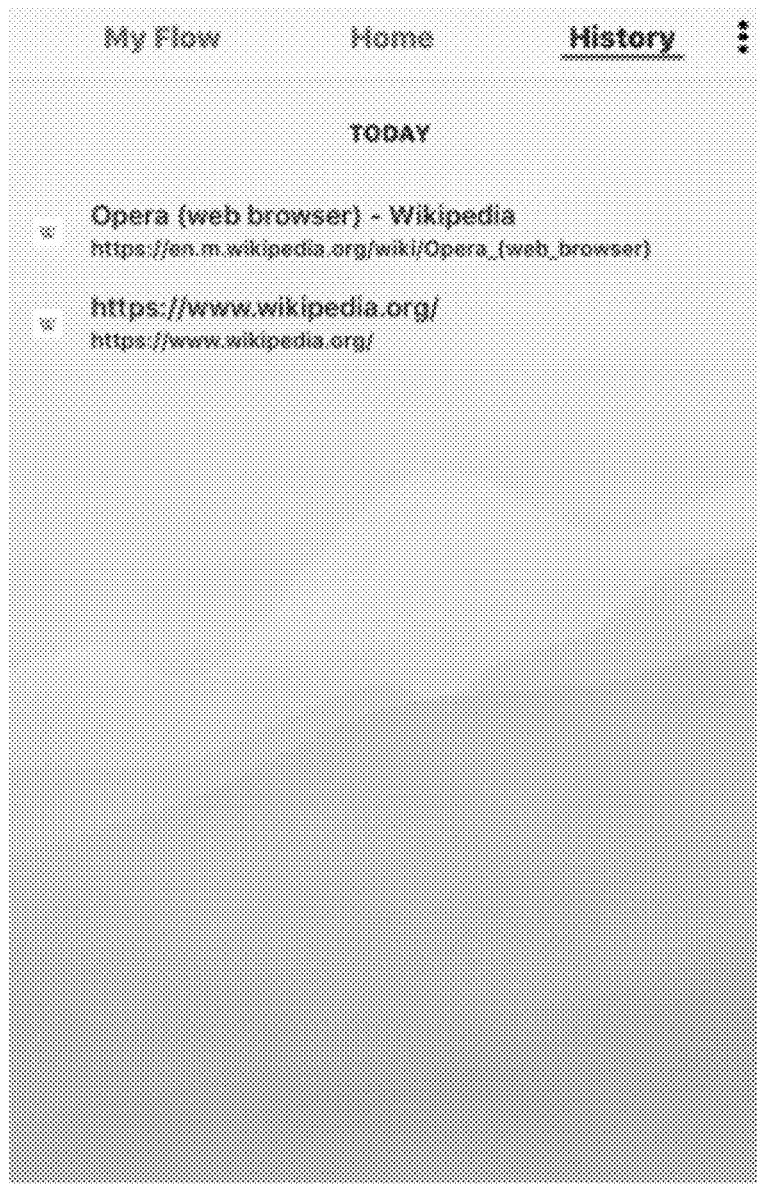
FIG. 6 shows a graph illustrating an example screen having a history of opened websites through a Drag Menu according to one embodiment of the present disclosure.

For example, FIG. 5 shows an example screen of a Drag Menu button 510 displayed on a display screen 520 of a mobile device after the application is launched. Context menu items and global menu items contained within the Drag Menu may not be shown on the home screen of the application until the user interacts with the button. In one embodiment, a current active application view may be a view of an opened browser tab that displays content of a website. The website may the latest website opened before the user quits the application. The opened browser tab may be shown as a global menu item in the Drag Menu and it may be immediately accessible via a tapping action on the Drag Menu button 510 by the user. In one embodiment, a current active application view may be a history page view presenting previously opened websites for the user to quickly return to the previously opened websites. The data processing system 110 is configured to store the history information including the websites recently opened for the user. For example, FIG. 6 shows a graph illustrating an example screen having a history of opened websites through a Drag Menu according to one embodiment of the present disclosure.

At 206, when preparing the current application view to display on a mobile device display screen, the data processing system 110 may check and determine whether Drag menu items for the current application view are available to be applied and displayed for the user in current context. Drag Menu items may be defined to correspond to and associated with a particular action that the user may take, which can cause some effect to the application. In one embodiment, a Drag Menu item may be a "New tab" action that will create a new tab instance in the application browser. For example, a single touch made on the Drag Menu button may initiate a "New tab" instance search screen. Another example of a Drag Menu item may be the "Reload" action that may cause the current website to be downloaded again from the network and re-rendered in the application browser. Referring to FIG. 4, a distinction may be drawn between Global menu items 430 and Context menu items 420 of Drag Menu. Global menu items 430 are displayed to be associated with actions that may be seen as primary actions in an application and are always available to the user to use. In one example embodiment, a Global menu item for a web browser application may be shown to be associated with a "New tab" action that allows the user to create a new tab instance and enables the user to open a new website in a new context. The context menu items 420 and global menu items 430 are displayed on the screen 440 only when the Drag Menu button 410 is touched. Alternatively, Global menu items may be defined as primary actions that speed up the user experience and are always available to the user to reduce the time needed to perform an action. A global menu item 430 may be associated with a "Select a tab" action that allows the user to switch to a different opened browser tab to change current context. For example, different opened browser tabs may be included and represented as respective global menu items for the user to quickly return to one of them by a tapping action.

Context menu items 420 are associated with actions available only in the specific application context and are not applicable in different contexts. Context menu items 420 may be perceived as secondary items, which are usually exposed in a separate part of the user interface for fast access. Context menu items 420 may not be always accessible. An example of a context menu item 420 may be the "Reload" action that causes the current website to be downloaded again from network and re-rendered. The "Reload" action may only be available for the opened tab view, but it may not be applicable for other views such as Home or History views. Other examples of context menu items may be "Close" (to close opened browser tab) or "Send" (used to share opened tab within a group and to allow other group members to get access to it) actions. Other examples of context menu items 420 for a web browser application may include "Search" or "Scan QR code", "Back" to a previous opened tab. A context menu item of a "Search" action may be associated with a tab search or a voice search.

At 216, when no menu items are available for the current application view, or it may not benefit user experience to provide menu items that are not primary actions, the Drag Menu may not be displayed over the current application view. There is only the Drag Menu button 510 displayed on the browser screen or the display screen 520 of the mobile device as illustrated in FIG. 5.

Figure 7:
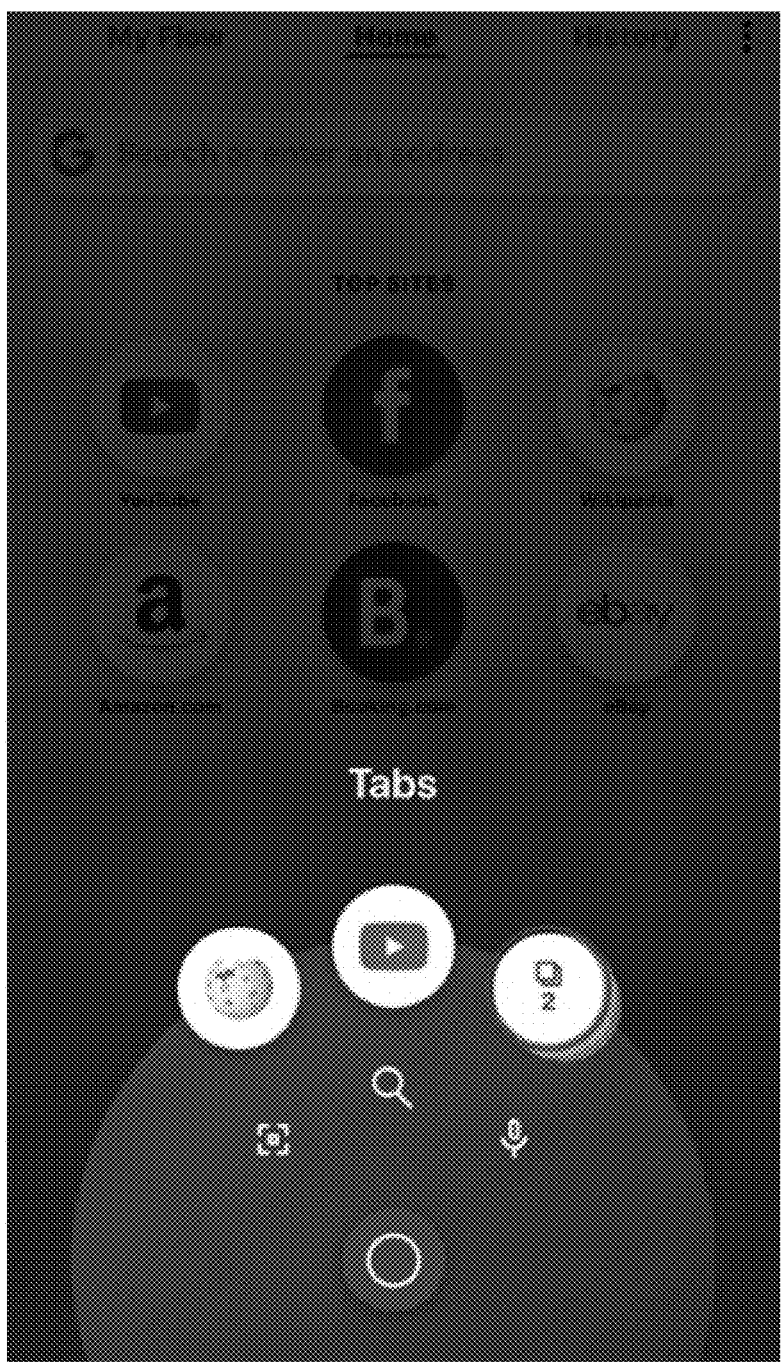
FIG. 7 shows a graph illustrating an example screen having a global menu item of Tabs according to one embodiment of the present disclosure.

Alternatively, at 208, when Drag Menu items are determined to be available by the processing system, the Drag Menu may be prepared for displaying on the display screen. First, items from the global menu items may be added and applied to the Drag Menu according to importance. An example for this step may be adding "Switch to tab" items to the global menu items. When many tabs have been opened, opened tabs may be presented as global menu items in the Drag Menu for fast interaction. Remaining opened tabs which cannot fit in the screen may be added to the "Tabs" in the global menu instead. For example, FIG. 7 shows a graph illustrating an example screen having a global menu item of tabs.

At 210, the current application view type may be checked again. The data processing system is required to determine the proper context menu items 420 that are applicable on the current view. The current application view type may be updated based on available context menu items corresponding to the actions taken by the user.

At 212, the data processing system 210 may apply available context menu items 420 to the Drag Menu based on the previous action on the Drag Menu. Context menu items 420 may include "Reload", "Close", "Search" or "Scan QR code", "Back" to a previous opened tab, and "Send to My Flow," etc. The context menu item of "Reload" may be configured by the data processing system to reload an opened browser tab via a tapping on the user display screen. The context menu item of "Close" may be configured by the data processing system to close an opened browser tab via a tapping on "Close" displayed on the user display screen.

At 214, after both global menu items 430 and context menu items 420 are applied, the Drag Menu may be displayed over the current application view and close to the bottom of the device screen so that it facilitates single-hand operation, for example, with the thumb, without the need for the user to change grip.

At 218, the processor of the data processing system may be configured to determine whether to close the application and quit the Drag Menu.

At 220, the user may use the Drag Menu to change the application view. The process may return to 204 to display current view of the application.

The central element of the Drag Menu may be the Drag Menu button 410 displayed in the browser. The Drag Menu button 410 may be initially the only visible element. Context menu items 420 and global menu items 430 contained within Drag Menu may not be shown until the user interacts with the Drag Menu button 410.

Referring back to FIG. 4, there may be few ways to interact with the Drag Menu Button 410. The first way may be to simply click (or tap) on the Button. In this case, the Drag Menu may not be expanded but a defined quick action may be performed instead. An example of a quick action may be to switch between the application's current view, such as opened browser tab, and a application browser's home screen. For example, when the user is on a browser tab view, quickly tapping the Drag Menu base icon may switch the browser tab view back to the application browser's home screen. Tapping the Drag Menu button 410 quickly again on the application browser's home screen may return to the previously opened browser tab. By this way, the Drag Menu button 410 may allow the user to perform a quick user action. If there is no opened browser tab, quickly tapping the Drag Menu base icon may initiate a new tab to display instance search screen. A quick tap on the Drag Menu button 410 may switch the browser tab view back to the application browser's home screen. If the use opens a website through the new browser tab, the opened browser tab may be shown as a global menu item of Drag Menu. The second way to interact with the Drag Menu button 410 may be to perform a long press (or long tap), which is done by pressing the Drag Menu button and holding it for a longer moment (for example, for around 1 second, which is noticeably longer compared to a quick button tap). After the long tap timeout is completed (meaning the user has held the Button for the required amount of time), the Drag Menu may be expanded as shown on FIG. 4. As long as user holds his finger on the screen, maintaining the tap, the expanded Drag Menu may be visible and maintained the same.

Releasing the tap over the Drag Menu Button, outside the Drag Menu area, or over none of the menu elements will have no action and will simply collapse the Drag Menu to the browser application's home screen showing the Drag Menu button 410 only as illustrated in FIG. 5.

Figure 8:
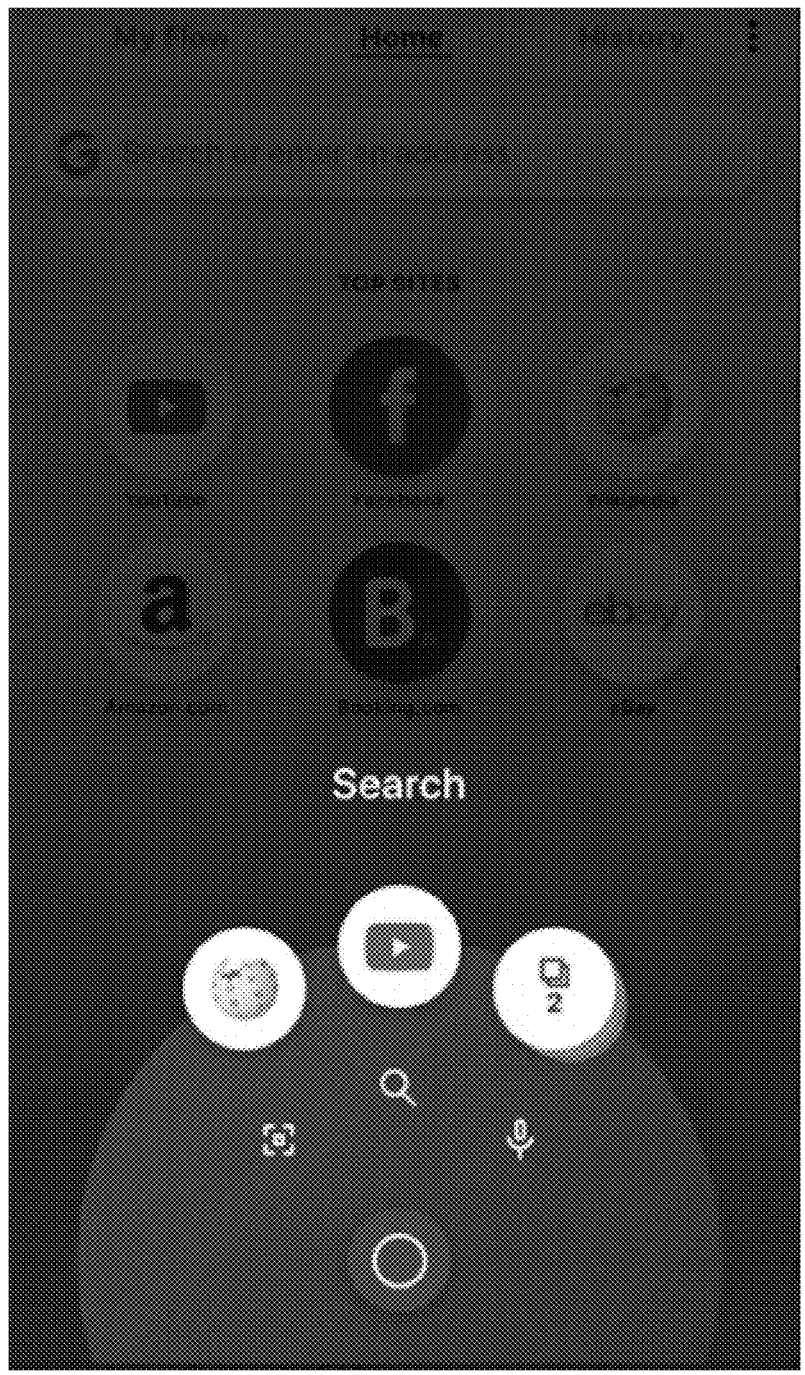
FIG. 8 shows a graph illustrating an example screen having a global menu item of Search according to one embodiment of the present disclosure.

While the Drag Menu is expanded and the user maintains the tap of Drag Menu button 410, it may be possible to move the finger in the direction of available Drag Menu items. When the finger enters the screen area of a menu item, this particular menu item may be highlighted and there may be another feedback mechanism confirming the selection of the menu item, such as a visual effect, haptic effect, vibration, or sound. At the same time, the name of the user action may be displayed in the form of a text label on the screen above the Drag Menu. The text label of the use action may describe the action to be performed on item activation. For example, FIG. 8 shows a graph illustrating an example screen having a global menu item with a text label of "Search" according to one embodiment of the present disclosure. This additional confirmation may be done to avoid confusion for the users and to improve user experience in the case of when the user's finger is covering part of the screen that represents the action fully.

Releasing the tap over the selected menu item may cause activation of this menu item, and the application is configured to execute selected user action.

In some embodiments, the third way to interact with the Drag Menu may be a swipe action made by a finger from the Drag Menu Button 410 to one of the context menu items 420 on the touch-sensitive display 440. Releasing the finger from one of the context menu items 420 may cause a corresponding action. For example, the user may detect an opened webpage or return to previous opened webpage by swiping the thumb from the Drag Menu Button to trigger the corresponding a context menu item 420.

In some embodiments, the fourth way to interact with the Drag Menu may be a swipe action made by a finger from the Drag Menu Button 410 to one of the global menu items 430 on the touch-sensitive display 440. Initiating a swipe on the Drag Menu Button (in such a way that the user wants to drag it into different place on screen) and maintaining the finger pressed may trigger the Drag Menu to expand. For example, the user may start a new search return to one of opened webpage, open the tabs by trigging the corresponding global menu item 430.

As described in various embodiments, all interactions with the Drag Menu items may be exactly as described above. It is to be noted that expanding Drag Menu by the swipe action helps with the single-hand user experience, as it is very comfortable to swipe the thumb over this part of the screen to cause the User Interface action.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method for selecting menu items from a menu of a mobile device, the method comprising:
    at least one processor of a mobile device causing a base icon to be displayed on a touch-sensitive display of the mobile device at a position easy to access by a user of the mobile device with a finger of a hand of the user when the user is holding the mobile device with only the hand;
    the at least one processor causing a plurality of context menu items to be displayed on the display in at least a partial ring around the base icon, the context menu items representing context items;
    the at least one processor causing a plurality of global menu items to be displayed on the display in at least a partial ring around the context menu items; and
    the at least one processor accessing or implementing an action associated with one of the menu items in response to the user using a drag gesture from the base icon to one menu item on the touch-sensitive display.

2. The method of claim 1, wherein the base icon is displayed on the display at a position adjacent to a thumb of the hand when the mobile device is being held by the hand.

3. The method of claim 1, further comprising the at least one processor causing the generation of feedback when the drag gesture enters the base icon.

4. The method claim 3, wherein the feedback is visual, haptic, vibration or sound or any combination thereof.

5. The method of claim 1, further comprising displaying an application behind at least some of the menu items.

6. The method of claim 1, further comprising displaying the base icon even when the base icon is not touched and displaying the context items and the global menu items only when the base icon is touched.

7. The method of claim 1, wherein the at least one processor performs an action when the base icon is tapped.

8. The method of claim 7, wherein the at least one processor performs an action when the base icon is held for an extended time longer than a tap.

9. The method of claim 7, wherein the at least one processor performs an action when the base icon is pressed and swiped to one of the context menu items on the touch-sensitive display.

10. The method of claim 7, wherein the at least one processor performs an action when the base icon is pressed and swiped to one of the global menu items on the touch-sensitive display.

11. A mobile device, comprising:
    at least one touch-sensitive display; and
    a processor coupled to the touch sensitive display, the at least one processor constructed and arranged to:
    cause the touch sensitive display to display a base icon at a position easy to access by a user of the mobile device with a finger of a hand of the user when the user is holding the mobile device with only the hand;
    cause the touch sensitive display to display a plurality of context menu items in at least a partial ring around the base icon;
    cause the touch sensitive display to display a plurality of global menu items in at least a partial ring around the contextual menu items; and
    access or implement an action associated with one of the menu items in response to a user using a drag or swipe gesture from the base icon to the one menu item on the touch-sensitive display.

12. The mobile device of claim 11, wherein the at least one processor causes the base icon to be displayed on the display at a position adjacent to the thumb of the hand when the hand is holding the mobile device.

13. The mobile device of claim 11, wherein the at least one processor causes the generation of feedback when the drag gesture enters the one menu item.

14. The mobile device of claim 13, wherein the feedback is visual, haptic, vibration or sound or any combination thereof.

15. The mobile device of claim 11, wherein the at least one processor causes an application to be displayed behind at least some of the menu items.

16. The mobile device of claim 11, wherein the at least one processor causes the base icon to be displayed even when the base icon is not touched and causes the contextual and global menu items to be displayed only when the base icon is touched.

17. The mobile device of claim 11, wherein the at least one processor performs an action when the base icon is tapped.

18. The mobile device of claim 17, wherein the at least one processor performs an action when the base icon is held for an extended time longer than a tap.

19. The mobile device of claim 17, wherein the at least one processor performs an action when the base icon is pressed and swiped to one of the context menu items on the touch-sensitive display.

20. The mobile device of claim 17, wherein the at least one processor performs an action when the base icon is pressed and swiped to one of the global menu items on the touch-sensitive display.

* * * * *